(12) United States Patent
Imaizumi et al.

(10) Patent No.: US 6,647,056 B1
(45) Date of Patent: Nov. 11, 2003

(54) CORRELATION CIRCUIT FOR SPREAD SPECTRUM COMMUNICATION, DEMODULATION CIRCUIT AND RECEPTION APPARATUS

(75) Inventors: Ichiro Imaizumi, Tokyo (JP); Kouya Hoshina, Tokyo (JP); Kenjiro Yasunari, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/512,063

(22) Filed: Feb. 24, 2000

(30) Foreign Application Priority Data

Feb. 24, 1999 (JP) .......................................... 11-046965

(51) Int. Cl.[7] .......................... H04B 1/69; H04B 1/707; H04B 1/713
(52) U.S. Cl. ........................ 375/150; 375/152; 375/147
(58) Field of Search ................................ 375/150, 151, 375/152, 153, 142, 143, 147

(56) References Cited

U.S. PATENT DOCUMENTS 5,768,306 A * 6/1998 Sawahashi et al. ......... 375/150
6,108,370 A * 8/2000 Naruse ....................... 375/150
6,516,020 B1 * 2/2003 Kurihara ..................... 375/150

FOREIGN PATENT DOCUMENTS

JP 09200179 7/1997

* cited by examiner

*Primary Examiner*—Chi Pham
*Assistant Examiner*—Demetria Williams
(74) *Attorney, Agent, or Firm*—Jacobson Holman PLLC

(57) ABSTRACT

In a conventional correlation circuit for spread spectrum communication, when a sliding correlator is used, much time is required. When a matched filter is used, a problem is that a circuit scale and power consumption are increased. In the present invention, however, there is provided a correlation circuit for spread spectrum communication which minimizes the number of constituting elements, and can reduce the power consumption. In the correlation circuit for spread spectrum communication of the present invention, a spread spectrum received signal is A/D converted and accumulated in a data memory unit by a symbol unit, data rate is converted, and a high-rate MF performs a product sum operation processing at a high rate so that a correlation output is obtained.

2 Claims, 5 Drawing Sheets

FIG. 2

| | Memory 1 | Memory 2 | Memory 3 | ... | Memory n |
|---|---|---|---|---|---|
| Clock [1] | Collectively read out one symbol to MF | | | | |
| Clock [2] | Product sum operation in MF | | | | |
| Clock [3] | | Collectively read out one symbol to MF | | | |
| Clock [4] | | Product sum operation in MF | | | |
| Clock [5] | | | Collectively read out one symbol to MF | | |
| Clock [6] | | | Product sum operation in MF | | |
| ... | ... | ... | ... | ... | ... |
| Clock [2n-1] | | | | | Collectively read out one symbol to MF |
| Clock [2n] | | | | | Product sum operation in MF |

CORRELATION CIRCUIT FOR SPREAD SPECTRUM COMMUNICATION, DEMODULATION CIRCUIT AND RECEPTION APPARATUS

BACKGROUND OF THE INVENTION

1. Field of the Invention

The present invention relates to a correlation circuit for spread spectrum communication for use on the side of a receiver of a spread spectrum communication system in mobile communication, radio LAN, and the like, particularly to a correlation circuit for spread spectrum communication, a demodulation circuit and a reception apparatus in which power consumption can further be reduced with a simple small-scale constitution.

2. Description of the Related Art

Generally in a spread spectrum (SS) communication system for use in mobile communication, radio local area network (LAN), and the like, on a transmission side, two stage modulation comprising performing narrow band modulation (primary modulation) and further performing spread modulation (secondary modulation) on transmission data is performed, and the data is transmitted. On a reception side, after despread is performed on the received data, thereby returning to the primary modulation, a base band signal is regenerated by a usual wave detecting circuit.

Furthermore, a conventional correlation circuit for spread spectrum communication which outputs correlation for modulating a spread spectrum received signal is constituted of a despread circuit, and a demodulation circuit of a code division multiple access modulated wave. Specifically, in the correlation circuit for spread spectrum communication, a sliding correlator (SC) constituted of a logic circuit is used to perform synchronous trapping and subsequently establish the correlation with the detected synchronous phase.

The sliding correlator uses the correlation circuit to shift a station emitted code series (spread code) by each bit and to obtain the correlation with each received code series. When the correlation is obtained with respect to the number of bits only of a code series length, the synchronous phase with which the correlation reaches a peak is obtained, and the synchronous trapping is performed.

Here, the sliding correlator as one of the conventional despread circuits will be described with reference to FIG. 4. FIG. 4 is a constitution block diagram of a part of the conventional sliding correlator.

A portion for obtaining a correlation output in the conventional sliding correlator is constituted of an A/D converter 31, a multiplier 32, a PN code register 33, an adder 34, and a delay circuit 35.

Each component of the above-described conventional sliding correlator will be described.

The A/D converter 31 is a high-precision analog/digital converter which converts an analog signal subjected to code division multiple access (CDMA) modulation, transmitted and received by an antenna(not shown) to a digital signal.

The PN code register 33 is a register for outputting a pseudo random noise (PN) code which is the same spread code as that used in the CDMA modulation on the transmission side.

The multiplier 32 is a multiplier which multiplies the digital received data outputted from the A/D converter 31 by the PN code outputted from the PN code register 33.

The adder 34 and the delay circuit 35 accumulate/add multiplication results outputted from the multiplier 32 for one symbol period and output the integrated value as the correlation output.

The operation of the conventional sliding correlator comprises converting the analog signal of the data received by the antenna to the digital signal in the A/D converter 31, multiplying the converted digital signal and the PN code outputted from the PN code register 33 in the multiplier 32, accumulating/adding the results in the adder 34 and the delay circuit 35, and outputting the addition results of one symbol as the correlation output.

The operation-further comprises shifting a multiplication timing in the multiplier 32 by one chip to change the phase, repeating the multiplication and accumulation/addition, and detecting the synchronous phase with which the correlation output reaches a peak.

The constitution in which the sliding correlator is used as this despread circuit is relatively simple, has a small number of gates, and therefore consumes a small amount of power. However, time is generally required by time of one symbol× the number of chips in one symbol until the synchronous trapping is performed. Therefore, there is a problem that much time is required until the correlation output is outputted.

To solve the problem that much time is required until the correlation output is outputted, it is proposed to use a matched filter (MF) in the correlation circuit for spread spectrum communication, instead of the sliding correlator.

The matched filter performs the synchronous trapping within one symbol time by collectively taking the correlation when the phase is shifted.

Here, the matched filter as another example of the conventional despread circuit will be described with reference to FIG. 5. FIG. 5 is a block diagram showing the constitution example of the conventional matched filter.

The conventional matched filter is constituted of an A/D converter 41, a multiplier 42, a PN code register 43, an adder 44, and a sample hold (S/H) circuit 45.

Each component of the conventional matched filter will be described.

The A/D converter 41 is a converter which converts a CDMA modulated analog input signal to a digital signal.

There are provided a plurality of sample hold (S/H) circuits 45 which successively take and hold digital signals from the A/D converter 41.

The PN code register 43 is a register for outputting a PN code which is a spread code.

The multiplier 42 multiplies the digital signal held in each sample hold circuit 45 by the PN code from the PN code register 43.

The adder 44 collectively adds outputs from the multipliers 42.

In the operation of the conventional matched filter, the input signal converted to the digital signal by the A/D converter 41 is successively held in a plurality of S/H circuits 45, the outputs from the S/H circuits 45 and the PN codes outputted from the PN code register 43 are multiplied in the multipliers 42, further the adders 44 collectively add the multiplication results of the multipliers 42, and an addition result is outputted. A correlation output is outputted from the addition result.

However, in the general matched filter, in order to take the correlation when the phases are collectively shifted, for example, the number of gates multiplied by the number of chips in one symbol is necessary for the above-described sliding correlator, so that the gate scale increases. Since the increases of LSI price and power consumption are caused, it is actually difficult to use the matched filter in the receiver of a mobile terminal.

Moreover, the base station of wide-band CDMA (W-CDMA) usually has a sector, and the periphery of 360 degrees is divided into six sectors to perform transmission/reception. When an adaptive antenna is unused, two antennas exist in each sector, and therefore perform the reception as the base station. For the number of signals to be demodulated since there are six sectors, two antennas, a complex signal I/Q, and a plurality of carrier frequencies (usually four waves), a multiple, that is, 6×2×2×4=96 in total results.

In order to hold the synchronization, or to detect a delay wave, further for demodulation, the matched filter (MF) or the sliding correlator (SC) is disposed, which further increases the hardware scale.

Additionally, the conventional sliding correlator and matched filter are described in Japanese Patent Application Laid-Open No. 200179/1997 laid open on Jul. 31, 1997 "Multi-User Demodulating Method and Apparatus" (applicant: Kokusai Electric Co., Ltd., Kabushiki Kaisha Takayama, inventors: Kenzo Urabe et al.).

This technique is applied to a method and an apparatus in which a problem about synchronization is solved without using an interference canceler.

As described above, the conventional sliding correlator has a problem that much time is required until the correlation output is obtained. Moreover, the conventional matched filter has a problem that the number of gates increases and that the increases of LSI price and power consumption are caused.

Furthermore, the base station has a large number of signals to be processed. When hardware is prepared for each signal, the scale increases, and as a result a problem of cost increase is brought.

Additionally, the number of users corresponding to the base station differs with the scale, but in the most typical base station, there are 32 users per sector (exactly, 32 channel per carrier wave, four carrier waves in total), and there are 192 users in total in one base station (exactly, 192 channels). However, since the signal to be processed may be processed for each carrier wave, there is no need for the processing of the four carrier waves at present. Specifically, it is not considered that the mobile station replaces the carrier wave in a time manner during communication. In this case, the number of signals for collectively processing 192 users is, as described above, 6 sectors×2 antennas×2 I/Q signals=24 signals in total.

SUMMARY OF THE INVENTION

An object of the present invention is to provide a correlation circuit for spread spectrum communication in which the number of constituting elements is reduced and power consumption can be lowered.

According to the present invention, in a correlation circuit for spread spectrum communication, a spread spectrum received signal is once converted to a digital signal and accumulated by a data unit of at least one symbol, rate conversion is performed to read the accumulated data by the symbol unit at a high rate, the data read at the high rate is multiplied by a spread code taken at the high rate, and a product sum operation processing for collective addition is performed at the high rate to output a correlation output. By using means for processing product sum operation at the high rate, the circuit scale is reduced, and the power consumption can be lowered.

Moreover, according to the present invention, there is provided a correlation circuit for spread spectrum communication comprising: a storage unit for once converting a spread spectrum received signal to a digital signal and accumulating data; and a processor for performing rate conversion to read the accumulated data by a symbol unit at a high rate, multiplying the data read at the high rate by a spread code taken at the high rate, performing a product sum operation processing to collectively add multiplication results at the high rate and outputting a correlation output. By using the processor for processing product sum operation at the high rate, the circuit scale is reduced, and the power consumption can be lowered.

Moreover, according to the present invention, there is provided a correlation circuit for spread spectrum communication comprising: A/D converting means for converting a spread spectrum analog received signal to a digital signal; storage means for accumulating a plurality of digital signals by a data unit of at least one symbol; data rate converting means for inputting one symbol of data from the storage means and outputting the data at a high rate; code generating means for generating a spread code, and outputting the code at the high rate; and high-rate product sum operating means for multiplying the data from the data rate converting means and the spread code from the code generating means; processing product sum operation to collectively add multiplication results at the high rate and outputting a correlation output. By using the high-rate product sum operating means to process the product sum operation at the high rate, the circuit scale is reduced, and the power consumption can be lowered.

Furthermore, according to the present invention, there is provided a demodulation circuit comprising the above-described correlation circuit for spread spectrum communication for demodulation and for a searcher of multipath detection.

Additionally, according to the present invention, there is provided a reception apparatus comprising a correlation circuit for spread spectrum communication comprising: a plurality of RF units for receiving spread spectrum analog high-frequency signals with a plurality of antennas covering sectors, performing wave detection of the received signals, and performing a demodulation processing for conversion to a base band signal; a plurality of A/D converters for converting I, Q base band analog signals outputted from the RF units to digital signals; a plurality of memory units for storing the digital signals from the A/D converters by a data unit of at least one symbol; a high-rate MF for receiving one symbol of digital signals from the memory units at a rate higher than a rate of the input digital signal to the memory unit; a code generator for generating a spread code; and a controller for controlling an operation timing in each unit.

The high-rate MF is a high-rate MF for multiplying the spread code inputted from the code generator by the digital signal received from the memory unit, processing product sum operation to collectively add multiplication results at the high rate and outputting a correlation output.

BRIEF DESCRIPTION OF THE DRAWINGS

FIG. 2 is an explanatory view showing an operation in the correlation circuit for spread spectrum communication according to the embodiment of the present invention.

DESCRIPTION OF REFERENCE NUMERALS

Figure 1:
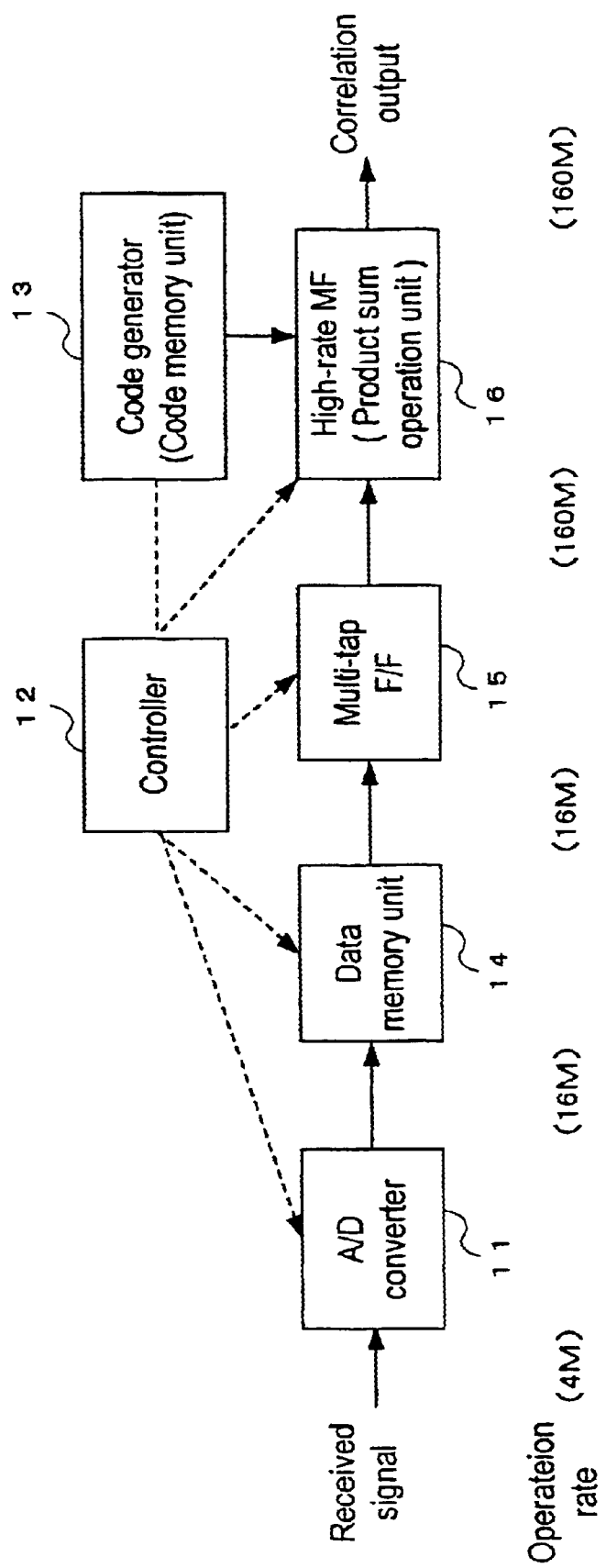
FIG. 1 is a block diagram of a correlation circuit for spread spectrum communication according to an embodiment of the present invention.

11 . . . A/D converter, 12 . . . controller, 13 . . . code generator, 14 . . . data memory unit, 15 . . . multi-tap F/F, 16 . . . high-rate MF, 51 . . . antenna, 52 . . . RF unit, 53 . . . A/D converter, 54 . . . memory unit, 55 . . . first high-rate MF, 56 . . . spread code generator, 57 . . . profiler, 58 . . . second high-rate MF, 59 . . . RAKE synthesizer, 60 . . . data and voice processor, 61 . . . controller, 62 . . . finger memory

DETAILED DESCRIPTION OF THE PREFERRED EMBODIMENT

An embodiment of the present invention will be described with reference to the drawings.

Additionally, function realizing means described below may be any circuit or apparatus as long as the means can realize functions, and some or all of the functions can also be realized by software. Furthermore, the function realizing means may be realized by a plurality of circuits, and a plurality of function realizing means may be realized by a single circuit.

The principle of the present invention will be described before describing an embodiment of the present invention.

The following functions need to be satisfied for demodulation of a W-CDMA signal in a reception apparatus in a base station.

For the demodulation, a signal phase (with respect to a symbol, a radio slot, a frame, and a plurality of delay waves) needs to be known beforehand. Thereby, product sum operation with a spread code is performed from the top position of a symbol correctly to some degree so that a correlation output can be outputted. In order to achieve only the function of outputting the correlation output, when there is a small number of received signals, only the constitution of the sliding correlator (SC) is sufficient.

The next function is of detecting the phase of the received signals including the delay waves.

There are roughly two types of received signals of the base station, a first type is a data channel signal whose phase can be foreseen to some degree, and a second type is a random access channel signal whose phase can hardly be foreseen.

In any case, the matched filter (MF) is necessary for detecting a delay wave component because the phase cannot be foreseen. Specifically, too much time is required for detecting the phase in the constitution of the sliding correlator (SC). When the number of sliding correlators (SC) is increased so as to shorten the time, the hardware scale is enlarged by the constitution of the matched filter (MF).

In the present invention, the above-described two functions can be achieved with one constitution but in a time division manner. A broader concept will be described. According to the correlation circuit for spread spectrum communication of the present invention, a spread spectrum received signal is once converted to a digital signal and accumulated by a data unit of at least one symbol, rate conversion is performed to read the accumulated data by the symbol unit at a high rate, the data read at the high rate is multiplied by a spread code taken at the high rate, and a product sum operation processing for collective addition is performed at the high rate to output a correlation output, so that the circuit scale is reduced, and the power consumption can be lowered.

Moreover, the function realizing means will be described. The correlation circuit for spread spectrum communication of the present invention comprises A/D converting means for converting a spread spectrum analog received signal to a digital signal, storage means for accumulating a plurality of digital signals for each symbol, data rate converting means for inputting one symbol of data from the storage means and outputting the data at a high rate, code generating means for generating a spread code and outputting the code at the high rate, and high-rate product sum operating means for multiplying the data from the data rate converting means and the spread code from the code generating means and processing product sum operation to collectively add multiplication results at the high rate to output a correlation output. By using the high-rate product sum operating means to process the product sum operation at the high rate, the circuit scale is reduced, and the power consumption can be lowered.

In the above-described invention, the A/D converting means corresponds to an A/D converter 11 and a controller 12 described below, the storage means corresponds to a data memory unit 14 and the controller 12 described below, the data rate converting means corresponds to a multi-tap flip/flop (F/F) 15 and the controller 12 described below, the code generating means corresponds to a code generator 13 and the controller 12 described below, and the high-rate product sum operating means corresponds to a high-rate MF 15 and the controller 12 described below.

Moreover, when the correlation circuit for spread spectrum communication of the present invention is applied to a demodulation circuit and a reception apparatus, the miniaturization of the circuit scale is realized, and the power consumption can effectively be reduced.

The correlation circuit for spread spectrum communication according to the embodiment of the present invention will next be described with reference to FIG. 1. FIG. 1 is a constitution block diagram of the correlation circuit for spread spectrum communication according to the embodiment of the present invention.

The correlation circuit for spread spectrum communication according to the embodiment of the present invention (present circuit) is, as shown in FIG. 1, constituted of: the A/D converter 11 for inputting a spread spectrum signal modulated by a spread code, and converting the analog signal to a digital signal; the controller 12 for controlling the operation timing of each unit; the code generator 13 for generating the spread code; the data memory unit 14 for storing data converted to the digital signal by a plurality of units; the multi-tap F/F 15 for reading and holding the data from the data memory unit 14; and the high-rate MF 16 for performing a high-rate product sum operation processing on an output from the multi-tap F/F 15 and the spread code outputted from the code generator 13.

Additionally, the data memory unit 14 and the multi-tap F/F 15 are not necessarily required, and when either one of the units exists, and the units have the same function, there is no problem on the circuit constitution.

Each component of the correlation circuit for spread spectrum communication (present circuit) according to the embodiment of the present invention will next concretely be described.

The A/D converter 11 inputs the spread spectrum received signal, converts the analog signal to the digital signal, and transmits the signal to the data memory unit 14. Additionally, in the example of FIG. 1, the input rate is an operation rate of 4 MHz clock. Since fourfold oversampling is performed, the output rate is an operation rate of 16 MHz clock.

The controller 12 controls the data input/output timing of each unit, and particularly controls the timings of high-rate output from the multi-tap F/F 15, spread code high-rate output from the code generator 13, high-rate processing in the high-rate MF 16, and the like.

The code generator 13 is a generator for generating a time series spread code (PN code) to transmit the spread code to the high-rate MF 16 at a high rate. The output timing of the spread code is set in accordance with the rate at which the product sum operation processing is performed in the high-rate MF 16.

Additionally, this code generator 13 may be replaced with a code memory or a code register for storing a plurality of spread codes, and is referred to as the "code memory unit" when the code memory is used.

The data memory unit 14 accumulates the A/D converted digital signal by the symbol unit, and is constituted of a plurality of memories by the symbol unit. For example, in FIG. 1, each of the input rate and the output rate is the operation rate of 16 MHz clock.

The multi-tap flip/flop (F/F) 15 reads the data from the data memory unit 14, performs rate conversion (time conversion) and transmits an output to the high-rate MF 16. For example, the data from the data memory unit 14 is inputted at the operation rate of 16 MHz clock and temporarily held, and the data is transmitted to the high-rate MF 16 at the operation rate of 160 MHz clock.

The high-rate matched filter (MF) 16 inputs the data from the multi-tap F/F 15 at a high rate, inputs the spread code from the code generator (or the code memory unit) 13 at a high rate, performs a product sum operation processing to perform multiplication of the data and the spread code and collective addition of multiplication results at a high rate, and outputs the correlation output.

For example, in FIG. 1, the data from the multi-tap F/F 15 is inputted at the operation rate of 160 MHz clock, the product sum operation processing is performed with the 160 MHz clock, and the correlation output is outputted with the 160 MHz clock.

The outline of the operation in the present circuit will be described.

The spread spectrum signal transmitted from a reception unit (not shown) is processed with the spread code at a so-called chip time interval, but the high-rate MF 16 is used to process the product sum operation at a high rate.

The time conversion is performed by accumulating at least one symbol of spread spectrum signals in the data memory unit 14, and reading the signals at a high rate as a result.

Therefore, even when no data memory unit 14 exists, the data from the A/D converter 11 may directly be accumulated in the multi-tap F/F 15, read from the multi-tap F/F at a high rate, and inputted to the high-rate MF 16, that is, a product sum operating unit. Moreover, the data may directly be transferred to the high-rate MF 16 from the data memory unit 14 at a high rate.

At present, the chip rate of so-called wide band CDMA (W-CDMA) proposed to IMT 2000 from Association of Radio Industries and Businesses (ARIB) is 4 Mcps. On the other hand, afar higher clock frequency of 500 MHz to 2 GHz is expected in an LSI manufacture process (CMOS 0.18 $\mu$m) in the year 2001 when the W-CDMA is practically used. Specifically, a far higher rate processing can be realized as compared with the frequency of the input signal. Since the chip rate is 4 Mcps, the signal is cut by about fourfold sampling during a signal processing. The matching with the spread code needs to be observed more precisely, but the clock for the processing is of 16 MHz. For example, 160 MHz is used as the clock rate. In this case, since this rate can sufficiently be realized even with the present CMOS 0.35 $\mu$m process/device, a tenfold processing can be realized.

The concrete operation in the present circuit will next be described with reference to FIG. 2. FIG. 2 is an explanatory view showing the operation in the correlation circuit for spread spectrum communication according to the embodiment of the present invention. Additionally, here, the phase of the delay wave component is already known.

One symbol of data is accumulated in the data memory unit 14 constituted of a plurality of memories. Since the phase of the delay wave component is already known, one symbol is accumulated from the top. In this case, as shown in FIG. 2, one symbol is first read out together to the high-rate MF 16 from one memory (memory 1) in the data memory unit 14 with a first clock (clock [1]).

The high-rate MF 16 performs the multiplication of the data and spread code and the addition in the next clock (clock [2]). Since the data symbol phase is known, a pipe line processing can be realized, and the product sum operation with the spread code can be performed in one clock time. As a result, after several clocks, the correlation output of the symbol is obtained, that is, demodulation can be performed.

In the next clock (clock [3]) one symbol of data is collectively read out to the high-rate MF 16 from another memory (memory 2). Additionally, for the spread code, if necessary, new codes are collectively written to the register of the high-rate MF 16.

Furthermore, in the next clock (clock [4]), the product sum operation of the data and spread code is performed. When this is successively repeated, the demodulation, can successively be performed every two clocks. Specifically, the data is read out with an odd clock, and the product sum operation is performed with an even clock.

Memories 1 to n have been described with reference to FIG. 2, but two memories 1 and 2 may alternately be used.

After accumulating I signal components in the memory 1 and Q signal components in the memory 2, the components are alternately subjected to the product sum operation four times in the high-rate MF 16, and the sum and difference are further calculated so that the complex MF can be constituted. Specifically, the product sum operation with the spread codes (I×i, I×q, Q×i Q×q) is performed, and sum Iq+Qi, and difference Ii+Qq are calculated. Thereby, four MFs are usually necessary, but the complex type can be handled with one MF+adder-subtracter, so that the hardware scale (the number of gates) can be reduced.

Here, when the clock rate is increased by a factor of ten times, and data diffusivity is set to 128, the demodulation of 128×4×10/2=2560 symbols can be performed in one real symbol time (31.25 $\mu$s when the chip rate is 4.096 Mcps). This means that the base station can handle 2560 users with one high-rate MF as the demodulating function. Of course, this high-rate. MF has to be constituted of the complex MF.

Moreover, it goes without saying that the number of users has to be halved in order to assume antenna diversity. In any case, the standard number of users of one base station, that is, 192 users can be processed for delay wave paths including the maximum necessary number of paths, that is, six paths. Additionally, when the data diffusivity is 256, twice the number can be processed.

When the clock rate can further be enhanced, for example, by a factor of 100 times to 1.6 GHz, further a tenfold processing can be performed with one high-rate MF.

In any case, as compared with the arrangement of sliding correlators (SC) heretofore considered to be optimum for the number of users, the hardware scale can be reduced in the above-described system. Concrete numerical values will be described hereinafter.

When the high-rate MF is used, as conditions, the number of gates per complex MF is set to 600 k gates, and the number of taps is 1024 taps (fourfold oversampling with diffusivity of 256, six input bits, 12 output bits, two data registers, two spread code registers).

Moreover, when the sliding correlator (SC) is used, as the conditions, the number of gates per complex SC is set to 600 gates, and six input bits, and 12 output bits are set.

Furthermore, the number of gates per F/F for use as the memory is set to 10 gates/bit. However, since SRAM, DRAM are used in LSI of the present invention, the occupying area in the LSI and power consumption can considerably be decreased as compared with the present calculated number of gates.

The constitutions of the high-rate MF of the present invention and the conventional SC will next be described briefly for comparison.

For the high-rate MF, two MFs are used for the searcher, and one MF is used for the demodulation. The necessity as the searcher will be described later.

When the number of gates is calculated, 600 k gates×3= 1800 k gates.

Moreover, when the number of gates of the memory unit is calculated, the number of signals for the collective processing is 24 signals (6 sectors×2 antennas×2 I/Q signals), and the number of gates of F/F is 60 gates (10 gates/bit×6 input bits), thereby resulting in:

60 gates×1024 taps×24 signals×2 symbols=2949 k gates.

Therefore, the total number of gates of the high-rate MF and memory unit is 4749 k gates.

Next, in the constitution formed by combining the conventional system sliding correlator (SC) and searcher, since SC unit requires 192 channels as one base station, the number of gates of the SC unit is as follows: 600 gates×192 signals×6 (for delay waves)=690 k gates.

Moreover, in a searcher unit, 6 sectors×2 antennas×600 k gates=7200 k gates. In this case, the capability of the searcher is set to one user/sector.

Therefore, the total number of gates in the conventional system is 7890 k gates.

Consequently, even when the number of gates is calculated assuming that the memory unit is constituted of F/F, the circuit scale can be reduced by 40% as compared with the conventional system.

Additionally, assuming that the above-described MF is a full MF as the function (completely functional MF), the gate scale, and the like are estimated, but the full MF does not have to be necessarily used. For example, the MF is divided into a so-called sample/hold unit for accumulating and moving the data, a code register unit, and a product sum operation unit, but the function can be realized only with the product sum operation unit. Therefore, even when the data (received signal and code) from the memory is directly supplied to the product sum operation unit, the same operation can be performed.

Moreover, the hardware constitution of the product sum operation unit can be constituted as described in Japanese Patent Application No. 345738/1998 "Correlating Method, Matched Filter and Cellular Terminal" filed by the present applicant, and further the hardware scale (the number of gates) can be reduced.

Two systems will next be described with respect to the function of detecting the phase of the received signal.

The phase of the signal from the user first needs to be detected as the base station. Subsequently or simultaneously, the multipath of the signal from the same user has to be detected. For this purpose, the same function as that of the matched filter is necessary.

In a first system, when the same function as that of the matched filter is used in multipath detection, for example, information is accumulated in the memory with the 16 MHz clock as usually performed, and read, for example, at 160 MHz, and the product sum operation is performed in the matched filter. In this case, since the rate is increased ten times, the correlation of one symbol (all delay wave (i.e., multipath) components in one symbol) can be taken in $\frac{1}{10}$ time of that of the matched filter with an ordinary operation rate.

In this case, the spread code is not changed for one symbol, but two symbols of spread spectrum signals are necessary at maximum, and at least two symbols need to be prepared as the memory. Here, when the delay wave does not exceed one symbol interval, the detection of the delay wave within one of several parts of one symbol is considered to be usually sufficient (more exactly, the detection within several tens of chip times is considered to be sufficient) Therefore, the data much closer to one symbol than to two symbols can be obtained.

By this operation the phase of the signal from one user and the phase of the multipath can be obtained in $\frac{1}{10}$ time of one symbol time. Strictly, the signal from ½ user is processed because two antennas are handled.

Therefore, the phase information for five users can be obtained within real time of one symbol by one high-rate MF, a plurality of data memories and a plurality of user code memories. By preparing two high-rate MFs as the searcher, the phase detection for ten users can constantly be performed.

As described above, as one base station, 192 users are handled, and about $\frac{1}{20}$ of the capability of the searcher is provided. Since the phase detection is necessary at the start of communication with the user, and the phase does not need to be constantly monitored in a communication state, the $\frac{1}{20}$ capability is considered to be sufficient. Even in the conventional system, the searcher function for six users is provided. The present system is the same in that the function is used in time division.

In a second system for a plurality of users, when the plurality of users are present in the same antenna, the spread code of each user is replaced at a high rate. The system can be achieved by performing the product sum operation with the data from the memory at a high rate. A plurality of antennas can be handled when a plurality of data are further replaced at a high rate (the spread code of each user is also replaced). In this case, there is an advantage that the data does not have to be necessarily changed at a high rate.

As described above, when the present circuit is used, the demodulating function in one base station can be achieved by a plurality of (three) high-rate MFs for the high-rate processing, a plurality of data memories, and a plurality of code memories, and the hardware scale can be reduced. The number of gates is calculated in the F/F constitution as the memory, but the memories such as SRAM and DRAM can be used. Therefore, the hardware scale (LSI occupying area) can considerably be reduced according to the above-described calculation.

However, when the memories such as SRAM and DRAM are used in the data memory, the multi-tap F/F for time conversion needs to be prepared between the data memory and the high-rate MF so that each of writing and reading rates can be achieved at 16 MHz. In near future, the reading at 160 MHz is possibly realized as the memory. In this case, the multi-tap F/F becomes unnecessary.

Moreover, as described above, the capability is superior to that of the compared conventional system.

The concrete operation in the present circuit will next be described.

A relatively simple operation (during ordinary communication) after symbol synchronization, radio slot synchronization, and frame synchronization are established will first be described with reference to FIG. 1.

The spread spectrum signal modulated by the time series spread code (PN code) is inputted, and converted to the digital signal in the A/D converter 11. Subsequently, the digital signal is held in the data memory unit 14 constituted of a plurality of memories, and the held data and the spread code are subjected to the high-rate product sum operation processing in the high-rate MF 16.

The data memory unit 14 successively takes one symbol of signals from the top sample according to an instruction of controller 12. Since the symbol synchronization, radio slot synchronization and frame synchronization are established, the phase in which the top sample of the specific symbol is present is already known.

Subsequently, when one symbol of signals is taken (e.g., when the diffusivity is 128, there are 512 samples for the fourfold oversampling), the controller 12 instructs the data memory unit 14 to perform collective reading at the rate which is ten times as high as the previous taking rate, that is, the sampling rate. Here, for the usual fourfold oversampling, the collective reading is instructed with 160 MHz which is ten times as high as about 16 MHz (exactly four times as high as 4.096 MHz).

However, when the reading rate of the data memory unit 14 is not increased by a factor of ten times, ten rows of multi-tap F/F 15 are prepared, so that the tenfold time conversion may be performed. Specifically, the reading from each memory is performed at 16 MHz, and the reading from the F/F rows is successively performed at 160 MHz which is ten times as high as 16 MHz.

The high-rate MF 16 receives the output to perform the product sum operation with the 160 MHz clock. In this case, the spread code is received from the code generator 13. The reading of this spread code is also instructed from the same controller 12. As a result, the product sum operation of the signals (for one path) from one user is completed every 1/512 hour which is 1/10 of the time required for the writing of one symbol, and the correlation output can be outputted. Therefore, when another symbol is stored in the data memory unit 14, the correlation can also successively be outputted by the high-rate MF 16.

In the base station, for the number of memories, 24 memories (6×2×2) of 6 sector users, 2 antennas/sector, 2 I/Q signals/antenna at maximum are necessary. Assuming that the carrier frequency difference is also individually handled, the necessary number is four times as large as 24 memories.

The synchronous trapping (the obtaining of signal phase) will next be described.

In the base station the phase of the signal from each user and the multipath (phase of the delay wave component) are obtained, and the demodulation of each symbol is performed based on the phase information as described above.

The data memory unit 14 successively takes two symbols of signals according to the instruction of the controller 12. When two symbols of signals are taken in (e.g., when the diffusivity is 128, there are 512 samples for the fourfold oversampling), the controller 12 instructs the data memory unit 14 to perform the reading at the rate which is ten times as high as the previous taking rate, that is, the sampling rate. Here, for the usual fourfold oversampling, the reading is instructed with 160 MHz which is ten times as high as about 16 MHz (exactly four times as high as 4.096 MHz).

However, when the memory reading rate is not increased by a factor often times, ten rows of multi-tap F/F 15 are prepared, so that the tenfold time conversion may be performed. Specifically, the reading from each memory is performed at 16 MHz, and the reading from the F/F rows is successively performed at 160 MHz which is ten times as high as 16 MHz.

Subsequently, the high-rate MF 16 receives the output to perform the product sum operation with the 160 MHz clock. First one symbol of data is collectively read into the sample hold (S/H) unit of the high-rate MF 16. In this case, the spread code is received from the code generator 13. The reading of this spread code is also instructed from the same controller 12. As a result, the product sum operation of the signals for one symbol from one user is completed in the time which is 1/10 of the time required for the writing of one symbol, and the correlation output can be outputted. Therefore, when another symbol is stored in the data memory unit 14, the correlation can also successively be outputted by the high-rate MF 16.

One high-rate MF 16 can handle ten users, 192 users at maximum can exist in one base station, and therefore 1/20 of the capability can be provided in a time division manner. In the base station, 24 memories of 6 sectors, 2 antennas/sector, 2 I/Q signals/antenna are necessary. Assuming that the carrier frequency difference is also individually handled, the necessary number is four times as large as 24.

Figure 3:
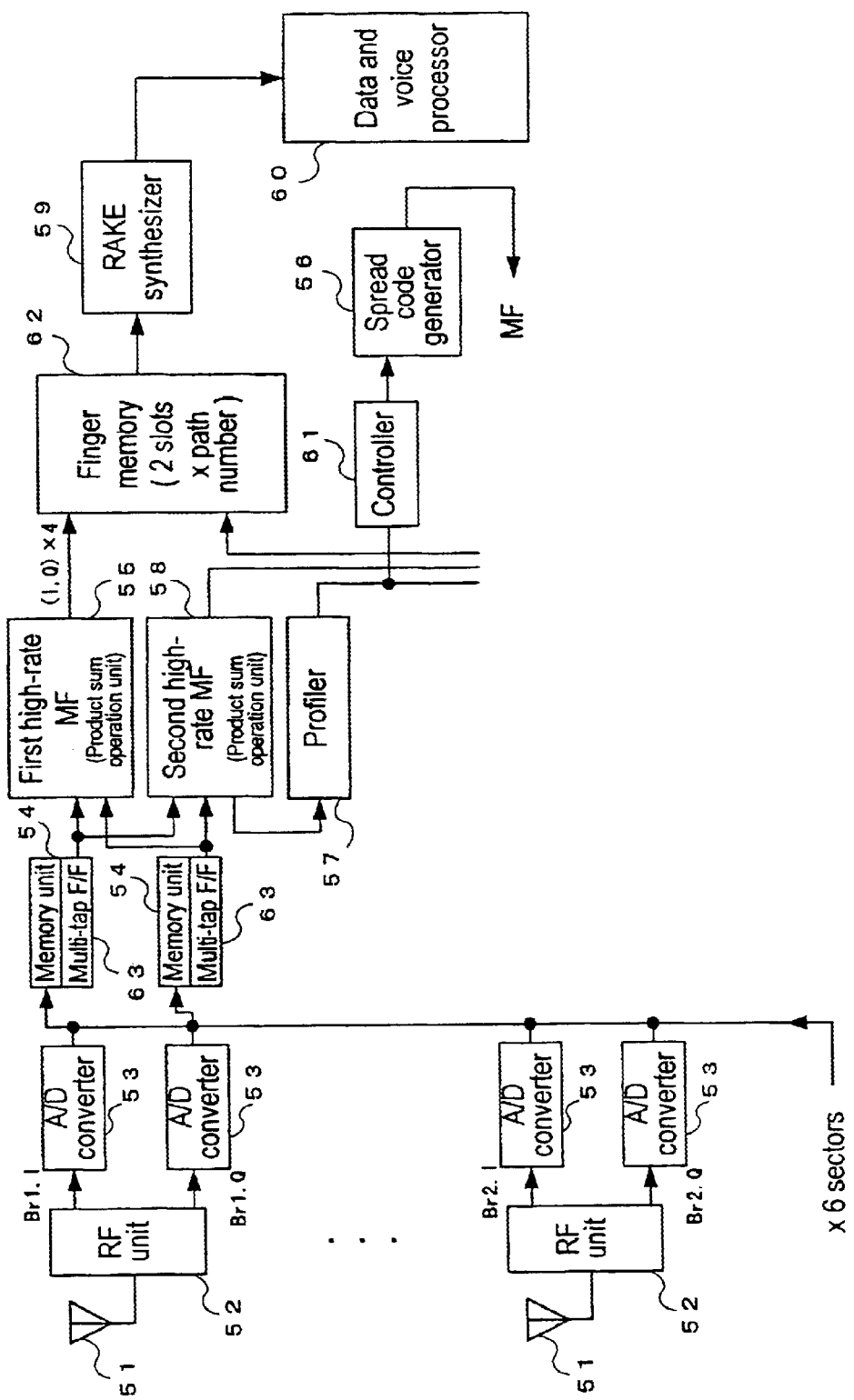
FIG. 3 is a concrete block diagram of the correlation circuit for spread spectrum communication according to the embodiment of the present invention.
Figure 4:
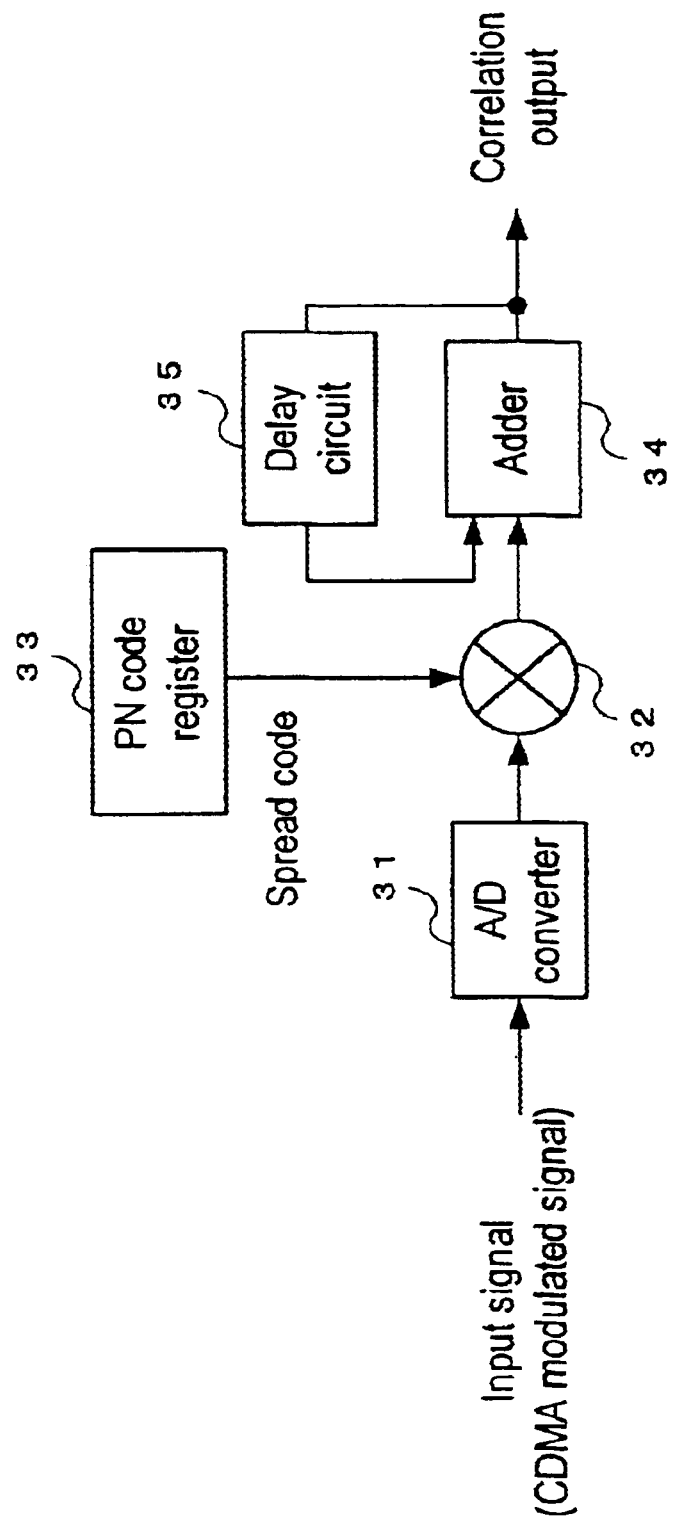
FIG. 4 is a block diagram showing a part of a conventional sliding correlator.
Figure 5:
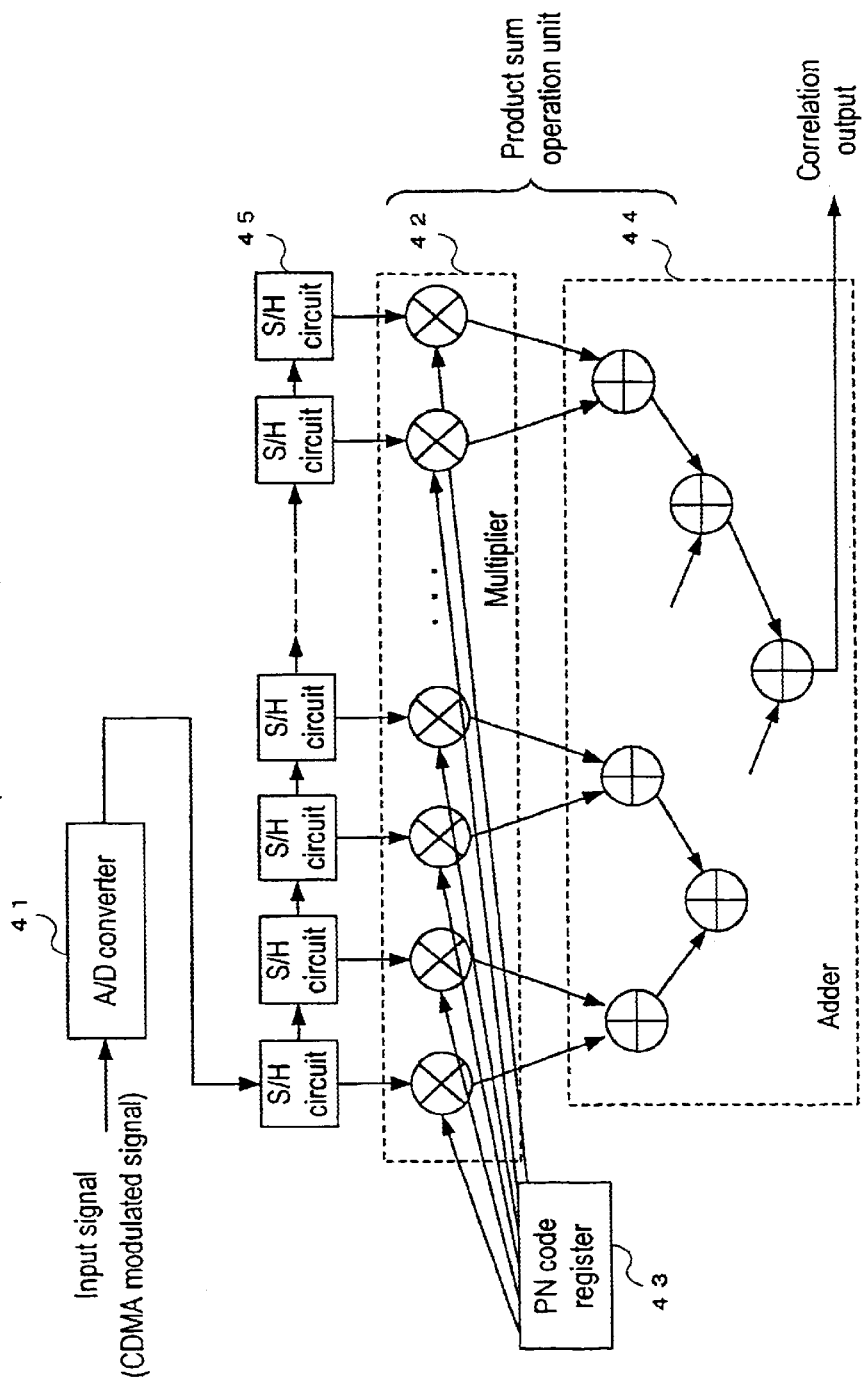
FIG. 5 is a block diagram showing a constitution example of a conventional matched filter.

The concrete constitution of the correlation circuit for spread spectrum communication according to the embodiment of the present invention will be described with reference to FIG. 3. FIG. 3 is a concrete block diagram of the correlation circuit for spread spectrum communication according to the embodiment of the present invention.

The concrete correlation circuit for spread spectrum communication is, as shown in FIG. 3, constituted of an antenna 51, an RF unit 52, an A/D converter 53, a memory unit 54, a first high-rate MF 55, a spread code generator 56, a profiler 57, a second high-rate MF 58, a RAKE synthesizer 59, a data and voice processor 60, a controller 61, a finger memory 62, and a multi-tap F/F 63.

Each component of the above-described circuit will concretely be described below.

For the antenna 51, usually two antennas are disposed for one sector to perform diversity reception. There are usually six sectors per base station. The diversity reception comprises receiving the same transmission signal with two antennas, and synthesizing the demodulated result to enhance the reception sensitivity.

The RF unit 52 includes a receiver for performing the frequency conversion of the analog signal reaching the antenna, band limitation, and a radio processing of a detected orthogonal wave, and a demodulator for demodulating orthogonal detected I, Q base signals.

The A/D converter 53 converts BB analog signal from the RF unit 52 to a digital signal. The number of conversion bits needs to be in a range of 4 to 6 bits. In the fourfold oversampling, the conversion frequency is 16 MHz for W-CDMA.

For the A/D converter 53, one unit each for I/Q signal, antenna is necessary, but when a high-rate processing can be performed, one unit may be disposed in a time division processing.

The memory unit 54 corresponds to the data memory unit 14 of FIG. 1, stores the above-described digital signal by a unit of at least one symbol, and reads the signal at a high rate. The writing rate is about one to four times as high as the chip rate, and the reading rate needs to be ten times or more as high as the rate. In this processing, so-called time conversion is performed. A memory capacity for at least 48 to 100 symbols is necessary. In the above-described MF system, the collective reading by the symbol unit is required.

The spread code generator 56 may be a register for storing the spread code, and transmits the designated spread code with the designated phase according to the instruction from the controller 61.

The profiler 57 performs an operation of taking outputs from the second high-rate MF 58, and designates a path. Thereby, the chip synchronization, symbol synchronization, radio slot synchronization, and frame synchronization can be taken, so that the path is detected.

These information are transmitted to the controller 61, and the instruction is transmitted to the spread code generator 56 from the controller 61.

The high-rate MFs 55, 58 take in the spread spectrum signal and the spread code, and perform the product sum operation by one symbol unit. Therefore, the high-rate MFs 55, 58 are requested to operate at a higher rate than the chip rate, but by performing the high-rate operation, the information from a plurality of memories can be processed at a remarkably high rate.

The finger memory 62 receives a plurality of correlation outputs from the high-rate MF, uses a pilot symbol to perform phase correction, and transmits an output to the RAKE synthesizer 59.

The RAKE synthesizer 59 synthesizes a plurality of paths in accordance with the input from the finger memory 62.

Additionally, AFC for adapting the frequency to that of the received signal, SIR measuring unit for measuring the present proportion of the received signal and noise (including the interference from the other signal), and the like are included.

The data and voice processor 60 performs the inverse conversion (demodulation) of various signals which are processed to correct errors on a transmission side. This includes deinterleave, Viterbi demodulation, CRC decoder, Reed-Solomon decoding (or turbo decoding), voice CODEC, and the like.

According to the correlation circuit for spread spectrum communication of the embodiment of the present invention, the spread spectrum received signal is A/D converted and accumulated by the symbol unit in the data memory unit 14, the reading rate is increased by the multi-tap F/F 15 and the data is outputted to the high-rate MF 16 to process the high-rate product sum operation. The high-rate MF 16 performs the high-rate processing of the product sum operation of the data and the spread code from the code generator 13 and outputs the correlation output. Therefore, as compared with the conventional system, the number of logical gates can remarkably be decreased, and the power consumption can effectively be lowered.

Moreover, when the correlation circuit for spread spectrum communication of the embodiment of the present invention is used, the CDMA demodulation circuit can be constituted with a small gate scale, and the miniaturization and power saving can effectively be realized for the base station LSI.

According to the present invention, there is provided the correlation circuit for spread spectrum communication for once converting the spread spectrum received signal to the digital signal and accumulating the signal by the data unite of at least one symbol, performing the rate conversion to read the accumulated data by the symbol unit, multiplying the data read at the high rate by the spread code taken in at the high rate, performing the product sum operation processing for the collective addition at the high rate to output the correlations output. Therefore, by using the means for processing the product sum operation at the high rate, the circuit scale is reduced,and the power consumption can effectively be lowered.

According to the present invention, there is provided the correlation circuit for spread spectrum communication comprising: A/D converting means for converting the spread spectrum analog received signal to the digital signal; storage means for accumulating a plurality of digital signals by the data unit of at least one symbol; data rate converting means for inputting one symbol of data from the storage means and outputting the data at the high rate; code generating means for generating the spread code, and outputting the code at the high rate; and high-rate product sum operating means for multiplying the data from the data rate converting means and the spread code from the code generating means, processing the product sum operation to collectively add multiplication results at the high rate and outputting the correlation output. By using the high-rate product sum operating means to process the product sum operation at the high rate, the circuit scale is reduced, and the power consumption can effectively be lowered.

What is claimed is:

1. A correlation circuit for spread spectrum communication comprising:

converting means for converting a spread spectrum received signal to a digital signal having I signal components and Q signal components;

a plurality of storage means for accumulating said converted digital signal by a data unit of at least one symbol;

data rate converting means for reading the data accumulated in said storage means at a high rate; and high-rate product sum operating means for performing a product sum operation four times alternately with I signal components stored in any storage means or Q signal components stored in other storage means except storage means that stored the I signal components and a spread code taken in at the high rate, calculating further sum and difference.

2. A reception apparatus comprising a correlation circuit for spread spectrum communication comprising:

a plurality of RF units for receiving spread spectrum analog high-frequency signals with a plurality of antennas covering sectors, performing wave detection of the received signals, and performing a demodulation processing for conversion to base band signals;

a plurality of A/D converters for converting I, Q base band analog signals outputted from said RF units to digital signals having I signal components and Q signal components;

a plurality of memory units for storing the digital signals from said A/D converters by a data unit of at least one symbol;

a high-rate MF for receiving alternately I signal components stored in any memory units or Q signal components stored in other memory units except memory units that stored the I signal components at a rate which is higher than a rate of the input digital signal to said memory units;

a code generator for generating a spread code; and a controller for controlling an operation timing in each component, said high-rate MF being a high-rate MF for performing a product sum operation four times alternately with the I signal components or the Q signal components and a spread code taken in at the high rate from the code generator, calculating further sum and difference and outputting a correlation output.

* * * * *